Nov. 3, 1931. T. R. BRICE 1,830,422
POWER LIFT ORCHARD PLOW
Filed June 21, 1929   2 Sheets-Sheet 1
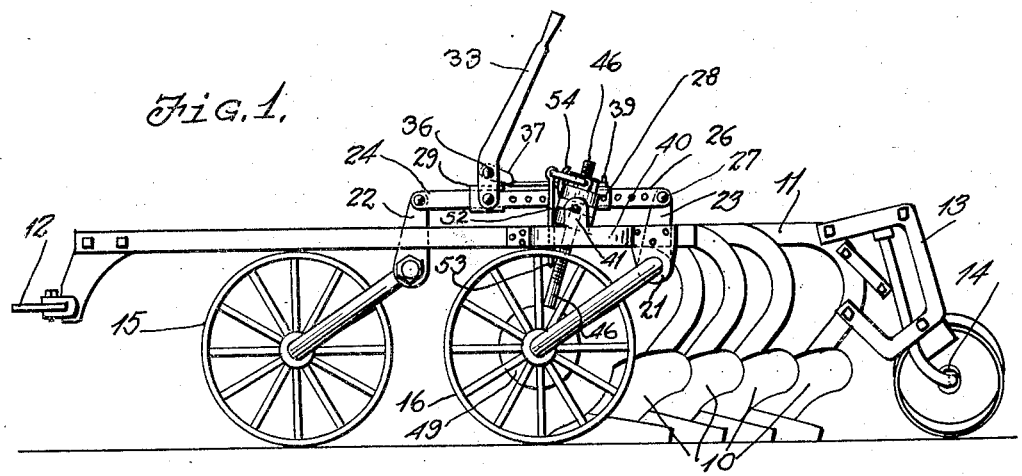
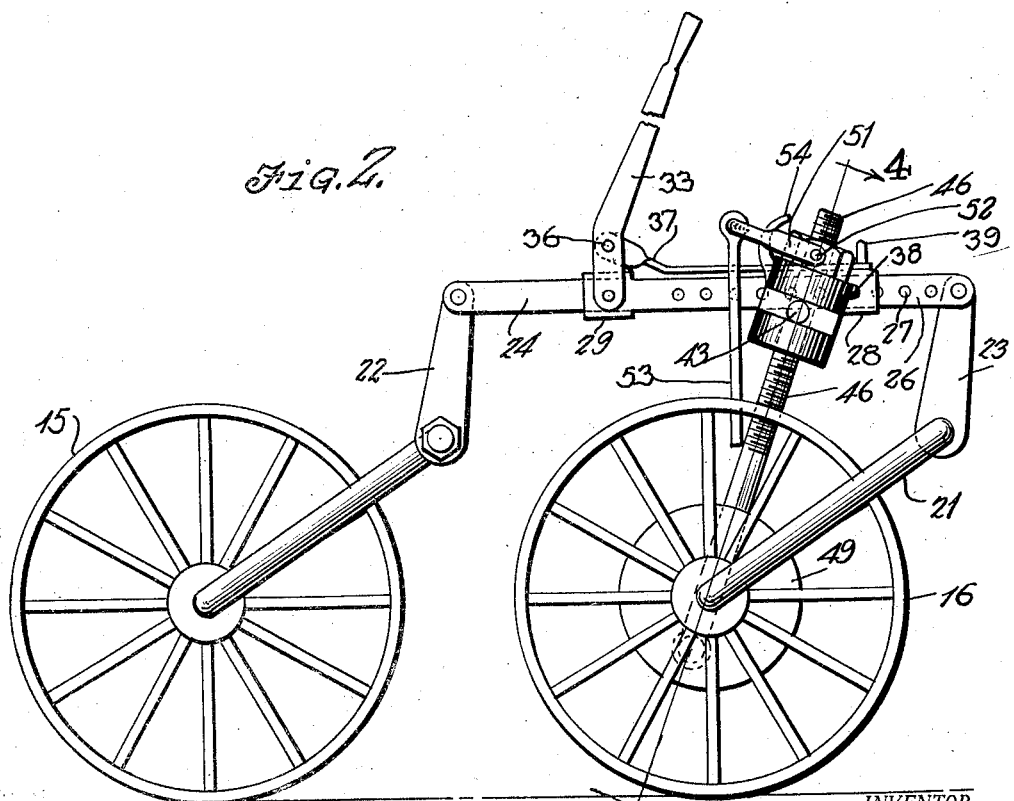
INVENTOR.
Thomas R. Brice.
BY
ATTORNEYS.

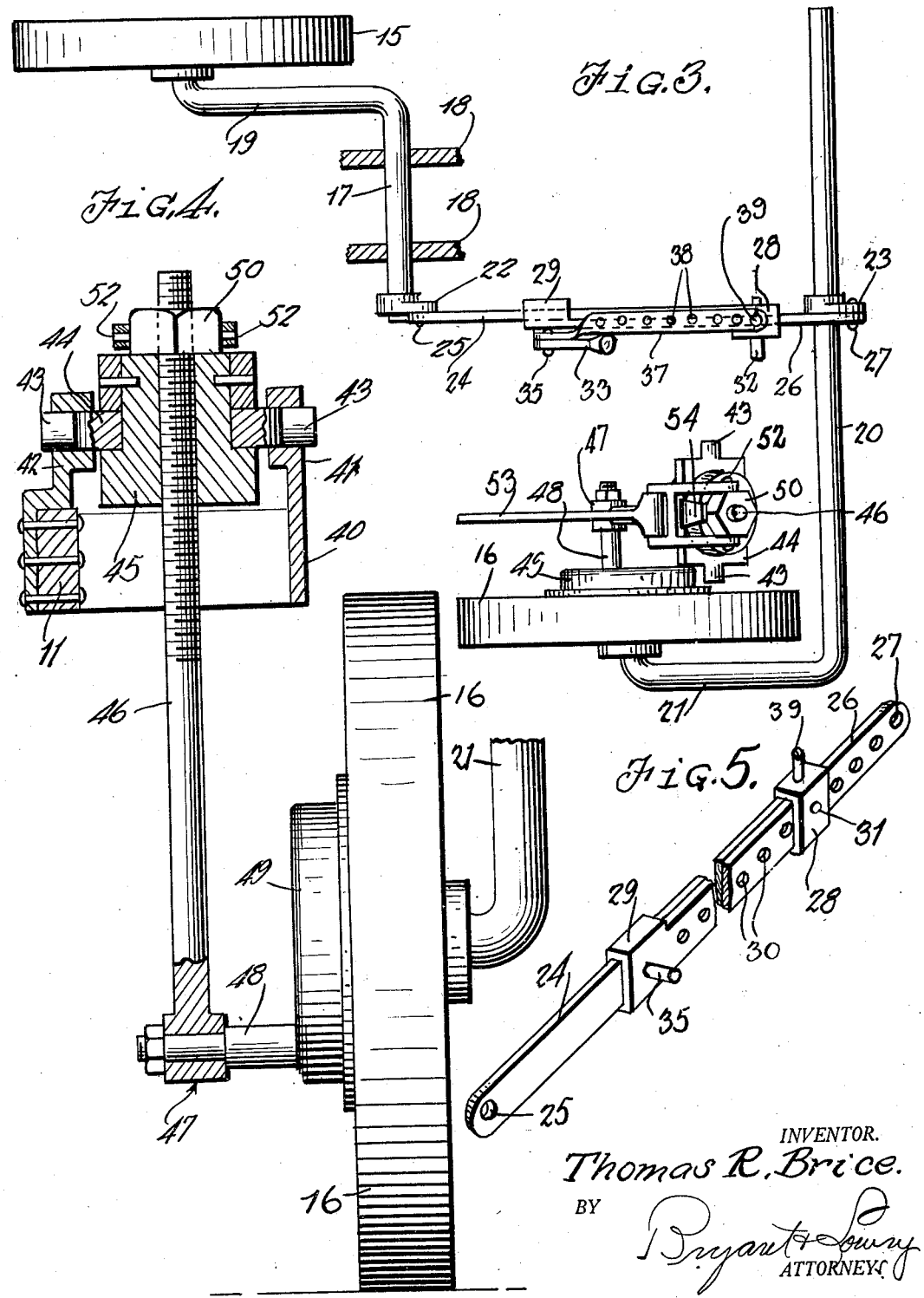

Patented Nov. 3, 1931

1,830,422

UNITED STATES PATENT OFFICE

THOMAS R. BRICE, OF DURHAM, CALIFORNIA

POWER LIFT ORCHARD PLOW

Application filed June 21, 1929. Serial No. 372,717.

This invention relates to certain new and useful improvements in power lift orchard plows, and has for its primary object to provide adjusting devices for varying the height of the plow beams or frames relatively to the ground wheels and eliminating the use of the customary elongated forwardly projecting levers for accomplishing this purpose, it having been found in practice that the adjusting levers for the ground wheels become loose and disengaged and cause considerable inconvenience in the use of a device of this general character.

A further object of the invention is to provide a gang plow in which the ground supporting wheel at each side of the plow structure is mounted on a shaft with an adjustable connection between the two shafts whereby the elevation of one wheel may be controlled and an independent adjustment provided for raising and lowering the other wheel, and in which an eccentric link rod connection between the last named wheel and plow frame is employed to effect raising and lowering movement of such wheel during forward travel thereof that is communicated to the other wheel.

With the above and other objects in view that will become apparent as the nature of the invention is better understood, the same consists in the novel form, combination and arrangement of parts hereinafter more fully described and shown, in the accompanying drawings and claimed.

In the drawings:—

Figure 1 is a side elevational view of a power lift orchard plow constructed in accordance with the present invention;

Figure 2 is a side elevational view of the ground wheels of the plow and associated mechanism with the plow frame and plows removed showing the adjustable connection between the two shafts for supporting the ground wheels to raise and lower one wheel, the raising and lowering means for the other wheel and the eccentric operating device for the last named wheel;

Figure 3 is a top plan view of the mechanism shown in Figure 2;

Figure 4 is a cross-sectional view taken on line 4—4 of Figure 2 showing the frame mounting for the swiveled screw block adjusting means for one wheel; and Figure 5 is a fragmentary perspective view of the adjustable connecting device between the two wheel supporting shafts.

Referring more in detail to the accompanying drawings, and particularly to Figure 1, there is illustrated a plurality of plows 10 carried by forwardly directed plow beams 11 pivotally connected at their forward ends in a conventional manner and to which forward end a draft rod 12 is attached. The plows 10 are diagonally arranged as shown in Figure 1, the rear curved end of the rear plow beam 11 being provided with a bracket 13 upon which a sulky wheel 14 is mounted. Ground wheels 15 and 16 are mounted, respectively, at opposite sides of the plow gang, the wheel 15 being positioned forwardly of the wheel 16, the wheels 15 and 16 being supported by the plow beam frame and being vertically adjustable for regulating the depth of cuts of the plows and also mounted in a manner to cause said plows to be raised and lowered during forward travel thereof.

The shaft 17, diagrammatically illustrated in Figure 3, is rotatably supported in brackets 18 depending from the adjacent plow beam frame, the shaft 17 being bent at right angles as at 19 at its outer end with the terminal portion thereof directed outwardly for the support of the ground wheel 15. The shaft 20 is journaled in brackets 21 depending from the adjacent plow beam frame and has its outer end bent at right angles as at 21 with the terminal portion directed inwardly for supporting the ground wheel 16.

The two shafts 17 and 20 are operatively engaged with each other through the medium of crank arms 22 and 23 carried respectively by the shafts 17 and 20 and fixed thereto, the connection further including a rod 24 pivoted as at 25 to the free end of the crank arm 22 and slidably associated with the rod 26 pivoted as at 27 to the free end of the crank arm 23. The forward end of the rod 26 carries a strap bearing 29 inclosing the rod 24 while the rear end of the rod 24 carries a strap bearing 28 enclosing the rod 26 for holding the two rods 24 and 26 in sliding assembled relation. The bar 26 is provided with a series of spaced openings 30 while the strap bearing 28 is provided with an opening 31 in each side thereof to register with the openings 30 with the rods 24 and 26 held in adjusted position by a cotter pin 32 or the like passed through the openings 30 and 31. A hand lever 33 is pivotally mounted as at 34 upon the pin 35 projecting laterally from the strap bearing 29 and has pivoted thereto as at 36 at a point adjacent the pivot 34, a metal strap 37 provided with a series of spaced openings 38 selectively receiving a perpendicular pin 39 carried by the strap bearing 28 as illustrated. This mechanism effects vertical adjustment of the ground wheel 15 for varying the depth of plow cut. When the bars 24 and 26 are completely slid upon each other as shown in Figure 3 with the strap bearing 28 located at the forward end of the rod 26, the ground wheel 15 is in its highest position and to lower the ground wheel for raising the plows 10, the cotter pin 32 is removed from the registering openings 30 and 31 in the rod 26 and strap bearing 28, while the strap 37 is engaged with the pin 39. Movement of the lever 33 will then shift the strap bearing 28 and rod 24 in a rearward direction for operating the crank arm 22 to rotate the shaft 17 and lower the ground wheel 15, thereby elevating the plows 10. The series of openings 38 in the strap 37 permits various adjustments of the ground wheel 15 to obtain the desired elevation of the wheel or depth of plow cut. The lever 33 is a comparatively short one and occupies a minimum of space in a lengthwise direction directly above the connected bars 24 and 26 and insures a secure and rigid adjustment of the ground wheel.

The vertical adjustment of the ground wheel 16 comprises a screw device having an eccentric connection with the wheel to cause the wheel 16 bodily to move through a circular path during rotation thereof and to impart such movement to the ground wheel 15 through the connection between the two shafts 17 and 20. A U-shaped bracket 40 is attached at its end to the outer side of the forwardly positioned plow beam 11 above the ground wheel 16 and carries an upstanding bearing 41 cooperating with the bearing 42 secured to the opposite side of the plow beam 11 as shown in Figure 4 and in which bearings 41 and 42, side pins 43 of a swiveled plate 44 are trunnioned. A screw block 45 is swiveled in the plate 44 and has a screw rod 46 threaded therethrough, the lower end of the screw rod 46 having a rotatable bearing connection 47 with a bearing pin 48 projecting eccentrically from a disk block 49 carried centrally of the wheel 16. A jamb nut 50 is threaded on the upper end of the screw rod 46 to be moved into binding engagement with the screw block 45 for holding the block against rotation on the screw rod 46 when in its adjusted position, a U-shaped strap 51 being pivotally connected at its ends as at 52 to diametrically opposite sides of the nut 50 with a handle 53 pivotally connected to the closed end of the strap 51. A finger projection or lug 54 carried by the screw block 45 and projecting upwardly therefrom is adapted to be disposed within the U-shaped strap 51 to form a lock for the nut 50, to prevent rotation thereof. After the desired adjustment of the ground wheel 15 is obtained, the handle 53 is employed for raising the strap 51 free of the lug 54 whereupon, the nut 50 is rotated by the strap 51 and handle 53 to separate the nut 50 from the screw block 45. Afterwards, the strap 51 is lowered into engagement with the lug 54 and upon rotation of the handle 53, and strap 51, the screw block is swivelly rotated in the plate 44 for vertically adjusting the screw rod 46 to raise and lower the wheel 16. After this adjustment has been obtained, the strap 51 is disengaged from the lug 54 and the nut 50 again moved into binding engagement with the screw block 45 by rotating the strap and handle with the strap again lowered into engagement with the lug to lock the nut 50 in position.

With a construction of this character, the vertical adjustment of the ground wheels 15 and 16 effect raising and lowering movements of the plow gang 10 to regulate the depth of cut and these devices operate in the absence of the customary elongated operating levers with the usual rack segments and dog, as that arrangement has been proved to be impractical as those parts become disengaged during the use of the apparatus and cause considerable difficulty and inconvenience. The eccentric mounting of the screw rod 46 and the ground wheel 16 causes the latter to move to a circular path during forward travel and rotation of the wheel and this motion is communicated by the shaft 20 through its connecting devices to the shaft 17 and other ground wheel 15.

From the above detailed description of the invention, it is believed that the construction and operation thereof will at once be apparent, and while there is herein shown and described the preferred embodiment of the invention, it is nevertheless to be understood that minor changes may be made therein without departing from the spirit and scope of the invention as claimed.

I claim—:

1. In a power lift orchard plow, a gang of plows, a wheel at each side of the plow gang, one disposed forwardly of the other, and means to cause raising and lowering movements of the wheels during travel thereof, the height adjusting means for one wheel including a screw block swivelly and pivotally mounted on the plow frame, a screw rod threaded through the block and eccentrically connected at its lower end to the wheel, a jamb nut on the upper end of the rod engaged with the screw block, and means for locking the nut against the block and cooperatively engaged with the block for rotating the same.

2. In a plow lift orchard plow, a gang of plows, a wheel at each side of the plow gang, one disposed forwardly of the other, means to cause raising and lowering movements of the wheels during travel thereof, independently operated means for varying the height of the wheels, the height adjusting means for one wheel including a screw block swivelly and pivotally mounted on the plow frame, a screw rod threaded through the block and eccentrically connected at its lower end to the wheel, a jamb nut on the upper end of the rod engaged with the screw block, and means for locking the nut against the block and cooperatively engaged with the block for rotating the same.

3. In a power lift orchard plow, a gang of plows, a wheel at each side of the plow gang, one disposed forwardly of the other, means to cause raising and lowering movements of the wheels during travel thereof, the connection between the wheels including shafts having crank ends upon which the wheels are mounted, crank arms fixed to the shafts, a pair of rods connected at their outer ends to the crank arms, means for longitudinally adjusting the rods to rotate one shaft for varying the height of one wheel, means for holding the rods in adjusted position, a jamb nut on the upper end of the rod engaged with the screw block, and means for locking the nut against the block and cooperatively engaged with the block for rotating the same.

4. In a power lift orchard plow, a gang of plows, a wheel at each side of the plow gang, one disposed forwardly of the other, means to cause raising and lowering movements of the wheels during travel thereof, independently operated means for varying the height of the wheels, the connection between the wheels including shafts having crank ends upon which the wheels are mounted, crank arms fixed to the shafts, a pair of rods connected at their outer ends to the crank arms, means for longitudinally adjusting the rods to rotate one shaft for varying the height of one wheel, means for holding the rods in adjusted position, a jamb nut on the upper end of the rod engaged with the screw block, and means for locking the nut against the block and cooperatively engaged with the block for rotating the same.

In testimony whereof I affix my signature.

THOMAS R. BRICE.